July 25, 1961   K. WILFERT   2,993,729
AUTOMOBILE BODY DOORS
Filed July 28, 1958
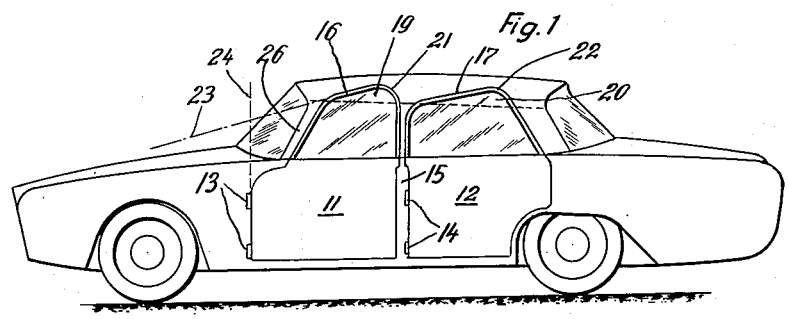
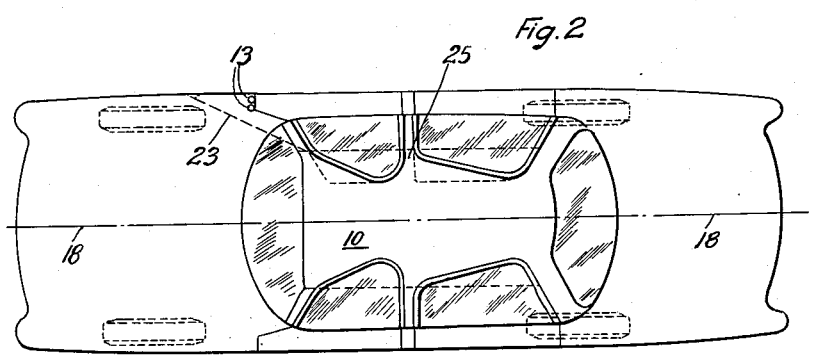
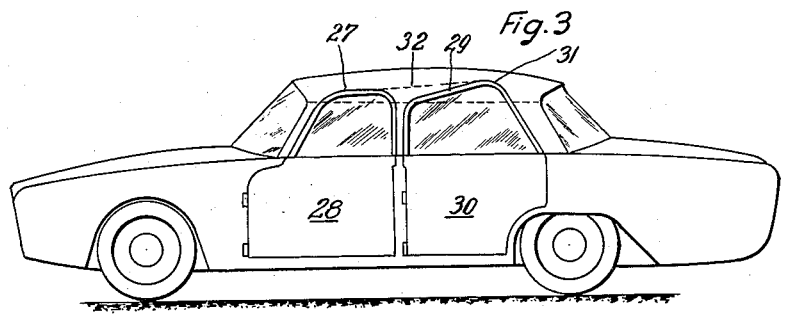
Inventor
KARL WILFERT
BY Dicke and Craig
ATTORNEYS United States Patent Office 2,993,729
Patented July 25, 1961

2,993,729
AUTOMOBILE BODY DOORS
Karl Wilfert, Stuttgart-Degerloch, Germany, assignor to Daimler-Benz Aktiengesellschaft, Stuttgart-Unterturkheim, Germany
Filed July 28, 1958, Ser. No. 751,448
Claims priority, application Germany Aug. 2, 1957
4 Claims. (Cl. 296—28)

My invention relates to a motor vehicle body, particularly for passenger cars, and more particularly to a motor vehicle body having one or more doors pivotal about a substantially vertical axis, the upper portion of the door extending into a recess provided in the roof of the body.

The tendency in the design of modern passenger cars to reduce the height of the body to a minimum confronts the designer with the problem of so constructing the door or doors as to permit the passengers to easily board and alight from the vehicle. While it has been proposed heretofore to provide the side walls of a motor car with door openings extending into the roof and to mount uniformly curved doors so as to be pivotal about a substantially vertical axis and as to be co-extensive with such openings, the top edges of such door openings and doors extend substantially parallel to the vertical central longitudinal plane of the body which has the disadvantage of considerably weakening the roof structure.

It is an object of my invention to provide a motor vehicle body with an improved door arrangement in which the upper portions of the door extend into recesses of the roof and lie flush therewith without substantially weakening the roof structure while affording easy and comfortable entrance and exit to the passengers. More particularly, it is the object of my invention to provide a motor vehicle body in which the contours of the door openings and the doors are so shaped as to naturally conform with the motions performed by the passengers when boarding the vehicle or alighting therefrom. Other objects are to so shape the contours of the door openings and doors extending into the roof of the motor vehicle body as to reduce the length of the roof section of the contour and, consequently, the length of the seals extending along such contour to a minimum and to avoid any material weaking of the roof structure permitting the side posts of the body to be continued by a strong roof section without any abrupt changes of cross section.

Finally, it is an object of my invention to so shape the top edge of the door of the vehicle body extending into the roof thereof that the seal cooperating with the top edge of the door is subjected to pressure directed substantially at right angles to the door edge when the door is closed so as to reduce the wear to a minimum and as to increase the durability of the seal and as to preclude any leakage through the roof section of the door opening.

Further objects of my invention will appear from the detailed description of two embodiments thereof following hereinafter with reference to the accompanying drawings. However, I wish it to be clearly understood that my invention is in no way limited to such details but is capable of numerous modifications within the scope of the appended claims and that the terms and phrases used in such detailed description have been chosen for the purpose of explaining the invention rather than that of restricting or limiting the scope thereof.

In the drawings:

FIG. 1 is a side view of a passenger car equipped with my improved body,

FIG. 2 is a plan view of the vehicle shown in FIG. 1, and

FIG. 3 is a side view of a slightly modified embodiment of my invention.

The body of the motor vehicle shown in FIGS. 1 and 2 has a roof 10 and side walls adjoining the roof. Each side wall is provided with two door openings extending into the roof. Doors 11 and 12 are so mounted that each door is co-extensive with one of the door openings. Means, such as hinges 13 and 14, are provided for pivotally connecting each door to the side wall for pivotal movement about a substantially vertical axis. The portion of each side wall located between the two door openings forms a post 15 which carries the hinges 14 for the rear door.

The roof 10 which in the conventional manner is dome-shaped being curved longitudinally and transversely and the doors and the door openings are so shaped that the top edge 16 and 17, respectively, of each door extends at an angle to the vertical longitudinal central plane indicated by the dash-dotted line 18—18 in FIG. 2 and at an angle to a horizontal plane of the vehicle. As a result, the portion 19 and 20, respectively, of each door extending into the roof 10 is a triangle having its tip 21 and 22, respectively, located adjacent to the rear edge of the door. Preferably, the tip is slightly rounded as will appear from FIGS. 1 and 2.

Preferably, the top edge 16, or 17 respectively, coincides with a line 23 which intersects the axis 24 of the hinges 13.

The novel shape of the contour of the door opening affords the passengers easy entrance and exit. Moreover, it results in a shorter seal at the upper edges 16 and 17 than could be obtained with edges extending parallel to the plane 18—18 as indicated in FIG. 2 by dotted lines. Also the roof 16 is weakened to a lesser extent and the joints 25 of the door posts 15 with the roof 10 are free from any abrupt change of cross section. The same applies to the joint between the front posts 26 with the roof.

Preferably, the inclination of the top edge of the door opening is so chosen that the top edge coincides with a line intersecting the vertical pivotal axis of the associated door. This is shown in FIGS. 1 and 2 with reference to the front door 11 where the top edge 18 coincides with a line 23 intersecting the axis 24 of the hinges 13. As a result, the seal provided co-extensive with the top edge 18 is subjected to pressure directed at right angles to the top edge 18 when the door 11 is closed. Hence, this section of the seal is not subject to any frictional wear and, therefore, will have an extended lifetime.

In the embodiment shown in FIGS. 1 and 2 the edges 16 and 17 include substantially the same angle with the plane 18—18 and with a horizontal plane.

In the embodiment illustrated in FIG. 3, however, the top edge 27 of the front door 28 is less inclined to the plane 18—18 and to the horizontal plane of the vehicle than is the top edge 9 of the rear door 30. Preferably, in this event the edge 27 of the front door coincides with a line 32 which is tangent to the rounded tip 31 of the rear door 30.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle body, the combination comprising a roof, a side wall adjoining said roof and having a door opening extending into said roof, a door co-extensive with said opening and so curved that its upper portion lies flush with said roof, means for pivotally connecting said door to said side wall about a substantially vertical axis, said roof, said door and said opening being so shaped that the top edge of said door extends at an angle to the vertical longitudinal central plane and to a horizontal plane of the vehicle, said upper portion of said door extending into said roof and being flush therewith being a triangle having its tip adjacent to the rear edge of said door.

2. The combination claimed in claim 1 in which said top edge coincides with a line intersecting said vertical axis, the latter being disposed at the lower portion of the front edge of said door.

3. In a motor vehicle the combination comprising a roof, a side wall adjoining said roof and having two door openings extending into said roof, doors co-extensive with said openings, each door having a front edge and a rear edge and being so curved that its upper portion lies flush with said roof, means disposed at said front edge for pivotally connecting each of said doors to said side wall about a substantially vertical axis, said roof, said doors and said openings being so shaped that the top edges of said doors extend at substantially equal angles to the vertical longitudinal central plane and to a horizontal plane of the vehicle, said upper portions of said doors extending into said roof and being flush therewith being triangles having their tips adjacent to said rear edges of said doors.

4. In a motor vehicle body, the combination comprising a roof, a side wall adjoining said roof and having a front door opening and a rear door opening, each opening extending into said roof, doors co-extensive with said openings and so curved that their upper portions lie flush with said roof, means disposed at the front edges of said doors for pivotally connecting each of said doors to said side wall about a substantially vertical axis, said roof, said doors and said openings being so shaped that the top edge of each of said doors extends at an angle to the vertical longitudinal central plane and to a horizontal plane of the vehicle, said upper portion of each of said doors extending into said roof and being flush therewith being a triangle having its tip adjacent to the rear door edge, said angle being smaller for the front door than for the rear door, said tip of said rear door being disposed on a line substantially coinciding with the top edge of said front door.

References Cited in the file of this patent

UNITED STATES PATENTS

| D. 56,020 | Montgomery | Aug. 10, 1920 |
| D. 123,616 | Bel Geddes | Nov. 19, 1940 |
| D. 134,921 | Frank | Jan. 26, 1943 |
| D. 135,325 | Swofford | Mar. 23, 1943 |
| 1,903,693 | Burney | Apr. 11, 1933 |

FOREIGN PATENTS

| 886,101 | Germany | Aug. 10, 1953 |